United States Patent
Shimomura

(10) Patent No.: US 9,312,115 B2
(45) Date of Patent: Apr. 12, 2016

(54) MASS SPECTROMETER

(75) Inventor: Manabu Shimomura, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 29 days.

(21) Appl. No.: 14/391,800

(22) PCT Filed: May 8, 2012

(86) PCT No.: PCT/JP2012/061711
§ 371 (c)(1),
(2), (4) Date: Oct. 10, 2014

(87) PCT Pub. No.: WO2013/168220
PCT Pub. Date: Nov. 14, 2013

(65) Prior Publication Data
US 2015/0262806 A1  Sep. 17, 2015

(51) Int. Cl.
H01J 49/06 (2006.01)
G01T 1/28 (2006.01)
H01J 49/02 (2006.01)
H01J 49/24 (2006.01)

(52) U.S. Cl.
CPC ............... *H01J 49/068* (2013.01); *G01T 1/28* (2013.01); *H01J 49/025* (2013.01); *H01J 49/24* (2013.01)

(58) Field of Classification Search
CPC .................................. G01T 1/28; H01J 43/18
See application file for complete search history.

(56) References Cited

U.S. PATENT DOCUMENTS 6,242,748 B1 * 6/2001 Gallagher ............. H01J 37/244
250/397
2006/0076483 A1 * 4/2006 Scheidemann ......... H01J 49/02
250/289
2010/0243887 A1 * 9/2010 Suyama .................. H01J 49/40
250/287

FOREIGN PATENT DOCUMENTS

| DE | 100 81 907 T1 | 7/2002 |
|----|---|---|
| DE | 100 84 907 T1 | 7/2002 |
| GB | 2 369 723 A | 6/2002 |
| JP | 58-304044 U | 3/1983 |
| JP | 8-077962 A | 3/1996 |
| JP | 2000-357487 A | 12/2000 |
| JP | 2003-506848 A | 2/2003 |
| JP | 2003-346702 A | 12/2003 |
| WO | 01/11655 A1 | 2/2001 |

OTHER PUBLICATIONS

International Search Report for PCT/JP2012/061711 dated Jun. 5, 2012.
Extended European Search Report issued Mar. 26, 2015 in European Patent Application No. 12876541.9.
International Search Report for PCT/JP2012/061711 dated Jun. 5, 2012, English Translation.

* cited by examiner

*Primary Examiner* — Jack Berman
(74) *Attorney, Agent, or Firm* — Sughrue Mion, PLLC

(57) ABSTRACT

Flanges (10*a*) of an attachment plate (10) integrally combined with an ion detector (5) are fixed to an inner surface of a vacuum chamber (1) via cushioning members (12), such as O-rings. Although the vacuum chamber (1) mechanically vibrates due to a turbomolecular pump attached to it, this vibration is absorbed by the cushioning members (12), whereby the vibration of the ion detector (5) is suppressed. As a result, the noise which occurs with a vibration of the ion detector (5) and is superposed on the detection signal is reduced. Thus, the quality of the detection signal can be improved by a simple and inexpensive structure.

3 Claims, 3 Drawing Sheets

NO COUNTERMEASURE AGAINST VIBRATION (CONVENTIONAL CASE)

WITH COUNTERMEASURE AGAINST VIBRATION (PRESENT INVENTION)

MASS SPECTROMETER

CROSS REFERENCE TO RELATED APPLICATIONS

This application is a National Stage International Application No. PCT/JP2012/061711 filed May. 8, 2012, the contents of all of which are incorporated herein by reference in their entirety.

TECHNICAL FIELD

The present invention relates to a mass spectrometer, and more specifically, to the structure of a mass spectrometer.

BACKGROUND ART

In general, mass spectrometers are configured so that ions generated from a sample component are separated according to their mass-to-charge ratios in a quadrupole mass filter or similar mass analyzer placed in a high-vacuum atmosphere and the separated ions are detected by an ion detector. FIG. 3 is a schematic configuration diagram of a common type of quadrupole mass spectrometer.

An almost hermetically sealed vacuum chamber 1 contains an EI ion source 2, an ion lens 3, a quadrupole mass filter 4, an ion detector 5 and other elements arranged along an ion beam axis C. When a gas containing a sample component is introduced into the EI ion source 2, the sample component comes in contact with thermions and is ionized. The generated ions are extracted from the EI ion source 2 and focused by the ion lens 3, to be introduced into the quadrupole mass filter 4 consisting of four rod electrodes. A preset amount of voltage composed of a radio-frequency voltage superposed on a direct-current voltage is applied from a power source (not shown) to each of the rod electrodes of the quadrupole mass filter 4. Only an ion having a mass-to-charge ratio corresponding to the voltage passes through the quadrupole mass filter 4 and reaches the ion detector 5.

As the ion detector 5, a secondary electron multiplier (EPM) is commonly used (see Patent Literature 1). FIG. 4 is a schematic configuration diagram of an ion detector 5 using a secondary electron multiplier. Each of the dynodes 51-56 arranged in a cascade structure is supplied with a preset amount of voltage from a power source 58. When an ion which has come from the left side on the figure and passed through the ion entrance 50 collides with the first conversion dynode 51, secondary electrons are emitted, which are then accelerated by an electric field and made to collide with the second dynode 52, which in turn emits a larger amount of secondary electrons. Such a process is repeated at each of the dynodes 53 . . . arranged in the cascade form, with the result that the secondary electrons are eventually multiplied to a significantly large number. The secondary electrons thus multiplied are made to enter a collector 57, and an electric current thereby generated in the collector 57 is extracted through a signal cable 59 as the detection signal.

To ensure high performance with the previously described mass spectrometer, it is necessary to maintain the inside of the vacuum chamber 1 at the highest possible degree of vacuum. In many cases, this is achieved using a vacuum pump consisting of the combination of a high performance turbomolecular pump (TMP) and a rotary pump for decreasing the back pressure for the TMP (see Patent Literature 2). Normally, as shown in FIG. 3, the turbomolecular pump 6 is directly connected to the vacuum chamber 1 in order to efficiently evacuate this chamber, while the rotary pump 7 is connected to the turbomolecular pump 6 via a connecting tube 8. The primary reason for separating the rotary pump 7 from the vacuum chamber 1 is to avoid internal contamination of the vacuum chamber 1 with the oil used in the rotary pump. By such a double-stage evacuation, the inside of the vacuum chamber 1 is maintained at low gas pressure (high degree of vacuum) within a range from $10^{-3}$ to $10^{-4}$ Pa.

As is commonly known, turbomolecular pumps perform evacuation in molecular units through interaction between moving blades (which are formed on a rotor rotated at high speeds) and stationary blades. Since the rotor is rotated at high speeds of up to several ten thousand rpm, turbomolecular pumps normally cause significant vibrations. In a system having a configuration as shown in FIG. 3, this mechanical vibration of the turbomolecular pump 6 is directly transmitted to the vacuum chamber 1, causing the various parts fixed to the vacuum chamber 1 to vibrate. The ion detector 5 is also one of the parts fixed to the vacuum chamber 1, which means that the mechanical vibration of the vacuum chamber 1 is also transmitted to the ion detector 5. The transmitted vibration may cause a noise in the detection signal extracted from the ion detector 5.

The primary reason for this noise is probably the vibration of a signal line (signal cable) extracted from the ion detector 5: When the signal line vibrates, the distance between the outer surface of the signal line and the vacuum chamber 1 or other surrounding members slightly changes, which causes a fluctuation in the impedance of the signal line. Since the preamplifier for amplifying detection signals from the ion detector 5 has a high input impedance, the fluctuation in the impedance of the signal line can easily appear as a noise. The frequency of the noise superposed on the detection signal due to the mechanical vibration of the turbomolecular pump is within a range from several hundred Hz through several kHz, which in some cases overlaps the frequency of the signal obtained by mass spectrometry. Therefore, it is difficult to electrically remove this noise using a filter or similar devices.

CITATION LIST

Patent Literature

Patent Literature 1: JP 2000-357487 A
Patent Literature 2: JP 2003-346702 A

SUMMARY OF INVENTION

Technical Problem

The present invention has been developed to solve the previously described problem. Its objective is to provide a mass spectrometer capable of performing an analysis with high accuracy by suppressing the noise superposed on the detection signal due to the mechanical vibration of a turbomolecular pump or similar vacuum pump.

Solution to Problem

The present invention aimed at solving the previously described problem is a mass spectrometer in which a mass analyzer for mass-separating ions to be analyzed and a detector for detecting the mass-separated ions are provided inside a vacuum chamber configured to be evacuated by a vacuum pump, characterized in that:

the detector is fixed to the vacuum chamber via a cushioning member.

The vacuum pump typically includes a turbomolecular pump and has a configuration in which the turbomolecular pump is attached to an outer surface of the vacuum chamber. Such a configuration allows the mechanical vibration of the turbomolecular pump to be directly transmitted to the vacuum chamber. The cushioning member absorbs the vibration from the vacuum chamber, whereby the vibration of the detector itself is suppressed. As a result, the noise resulting from the vibration and being superposed on the detection signal from the detector is reduced.

In one preferable mode of the mass spectrometer according to the present invention, an attachment part on an ion entrance side of the detector is fixed to the vacuum chamber without the cushioning member inserted in between while an attachment part on a detection-signal extraction side of the detector is fixed to the vacuum chamber via the cushioning member.

The ion entrance of the detector is an opening through which ions selected by the mass analyzer in the previous stage enter the detector. For example, if the mass analyzer is a quadrupole mass filter, the ions passing through the mass filter have the highest density in the vicinity of the central axis of the mass filter. Therefore, to efficiently introduce the ions into the detector, the central axis of the quadrupole mass filter should preferably be made to coincide with that of the ion entrance part of the detector.

If the quadrupole mass filter is fixed to the vacuum chamber, and if the attachment part on the ion entrance side of the detector is also fixed to the vacuum chamber as in the previously described mode, both the quadrupole mass filter and the ion entrance part of the detector vibrate in almost the same way when the vacuum chamber vibrates. Therefore, if the quadrupole mass filter and the ion entrance part of the detector are arranged so that their central axes coincide with each other, the coincidence of the two central axes will be maintained even when the vibration due to the vacuum pump occurs. Accordingly, the ions which have passed through the quadrupole mass filter can be efficiently introduced into the detector.

On the other hand, the attachment part on the detection-signal extraction side of the detector is fixed to the vacuum chamber via the cushioning member. Therefore, the vibration of the attachment part on the detection-signal extraction part of the detector is adequately suppressed as compared to the case where no cushioning member is provided. Therefore, the signal line extracted from the detector barely vibrates, and the noise due to this vibration is less likely to occur.

In the case where the ion entrance part and the detection-signal extraction part are closely located to each other in the detector, it is difficult to suppress the vibration of the detection-signal extraction part without providing the cushioning member at the attachment part on the ion entrance side. In general, a detector including a secondary electron multiplier has a considerable distance between the ion entrance part and the detection-signal extraction part since the secondary electron multiplier includes a cascade system of dynodes. Therefore, the previously described mode of the invention is particularly effective when applied in a system which employs a detector including a secondary electron multiplier.

Advantageous Effects of the Invention

In the mass spectrometer according to the present invention, the noise superposed on the detection signal due to the mechanical vibration of the vacuum pump is reduced by a simple and inexpensive configuration. As a result, for example, the mass accuracy and the detection sensitivity will be improved.

BRIEF DESCRIPTION OF DRAWINGS

FIGS. 1A and 1B are schematic diagrams showing attachment structures for a detector in one embodiment of the mass spectrometer according to the present invention, while

DESCRIPTION OF EMBODIMENTS

One embodiment of the mass spectrometer according to the present invention is hereinafter described with reference to the attached drawings. The overall configuration of the mass spectrometer of the present embodiment is the same as that of the conventionally used common type of quadrupole mass spectrometer shown in FIG. 3 and hence will not be described. The configuration of the ion detector itself is also the same as that of the conventional ion detector shown in FIG. 4 and hence will not be described.

Figure 1A:
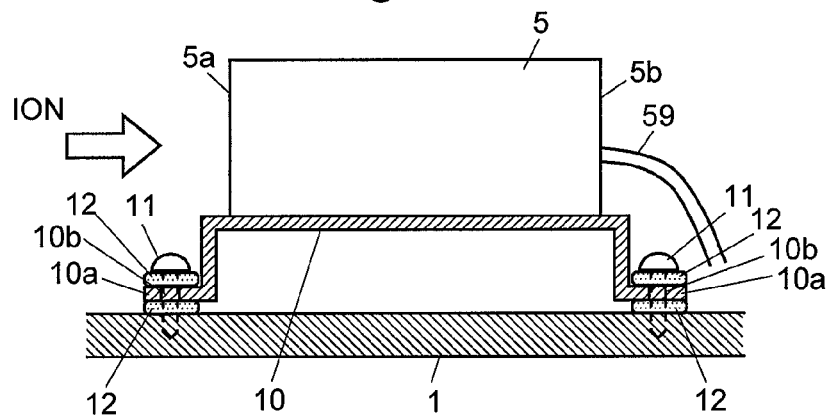

FIG. 1A is a schematic configuration diagram showing an attachment structure for the ion detector in the mass spectrometer of the present embodiment. FIG. 1C is a schematic configuration diagram showing an attachment structure for the ion detector in a conventional mass spectrometer. In those figures, ions enter the ion detector 5 from the left side as indicated by the arrows. The detection signal produced corresponding to the incident ions is extracted through the signal cable 59 extending from the ion detector 5 rightward. That is to say, the left surface of the ion detector 5 is the ion entrance surface 5a and the right surface is the detection-signal extraction surface 5b.

A rigid attachment plate 10 is fixed to the bottom surface of the ion detector 5 in such a manner that the ion detector 5 and the attachment plate 10 constitute an integral structure. The flanges 10a which horizontally extend from the lower end of the attachment plate 10 have screw holes 10b. The attachment plate 10 is fixed to the inner surface of the vacuum chamber 1 with screws 11 passed through those screw holes 10b. In the conventional case, as shown in FIG. 1C, the attachment plate 10 is fixed to the vacuum chamber 1 with screws 11 passed through the screw holes 10b directly or via washers or similar high-rigidity members (not shown) inserted in between. Accordingly, mechanical vibrations of the vacuum chamber 1 are directly transmitted via the attachment plate 10 to the ion detector 5

By contrast, in the mass spectrometer according to the present embodiment, as shown in FIG. 1A, the screw holes 10b bored in the flanges 10a of the attachment plate 10 are each sandwiched between a pair of ring-shaped cushioning members 12, and the attachment plate 10 is fixed to the inner surface of the vacuum chamber 1 by installing the screws 11 into the vacuum chamber 1 via the cushioning members 12. The cushioning members 12 almost entirely absorb mechanical vibrations of the vacuum chamber 1 and thereby suppress the vibration of the attachment plate 10 as well as that of the ion detector 5 integrally combined with this plate.

As the ring-shaped cushioning member 12, for example, an O-ring made of an elastic materials can be used. To avoid the situation where unwanted gas is emitted from the cushioning member 12 and contaminates the inside of the vacuum chamber 1, the cushioning member 12 should preferably be made of a material which barely releases gas. As a specific example, a Viton O-ring ("Viton" is a registered trademark of DuPont) or an equivalent product is suitable as the cushioning member 12.

Figure 2A:
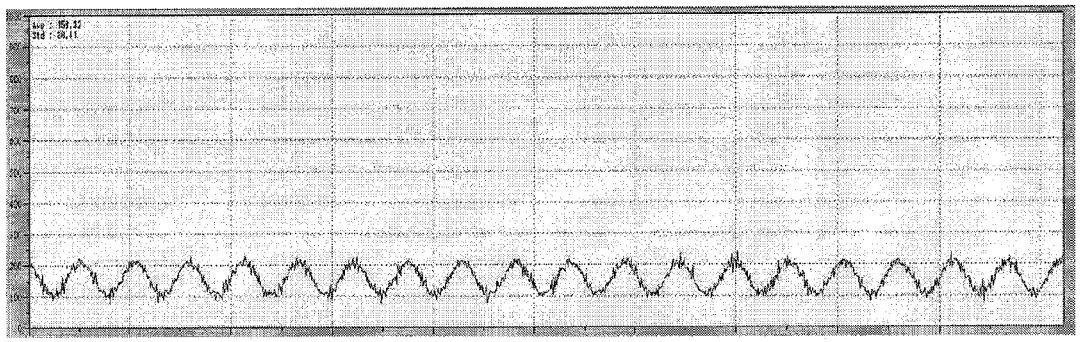
FIGS. 2A and 2B are actually measured waveform diagrams showing the noise suppression effect by the mass spectrometer of the present embodiment.
Figure 2B:
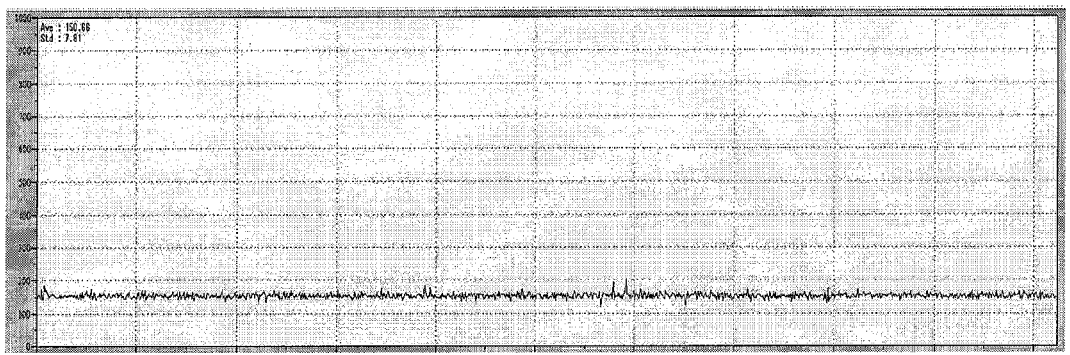

FIG. 2A shows the waveform of a detection signal actually measured in the case where no countermeasure against vibration using the cushioning member 12 was taken, and FIG. 2B shows the waveform of a detection signal actually measured in the case where the countermeasure against vibration using the cushioning member 12 was taken as shown in FIG. 1A. The use of the cushioning member 12 is evidently effective in reducing the noise. These results demonstrate that the noise superposed on the detection signal can be adequately suppressed by taking the previously described simple countermeasure against vibration.

Figure 3:
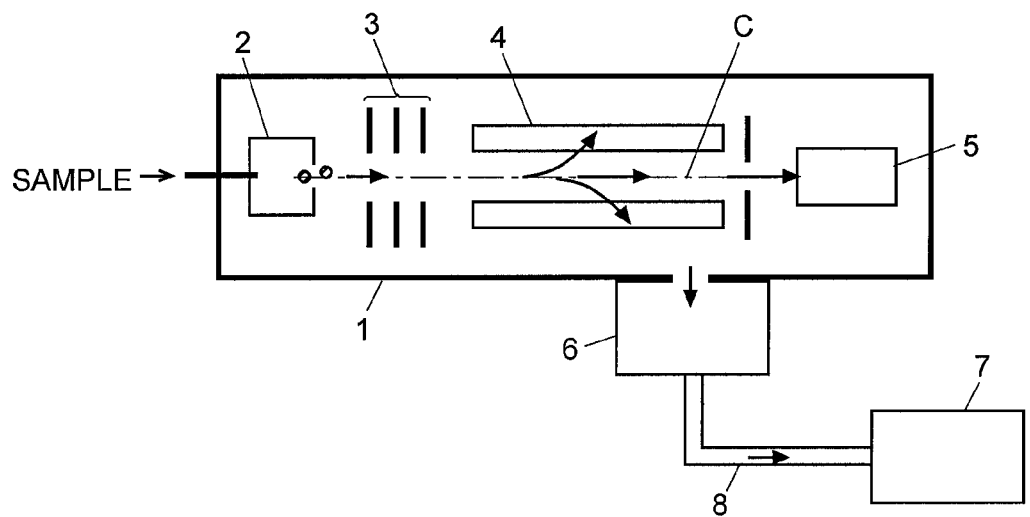
FIG. 3 is a schematic configuration diagram of a common type of quadrupole mass spectrometer.
Figure 4:
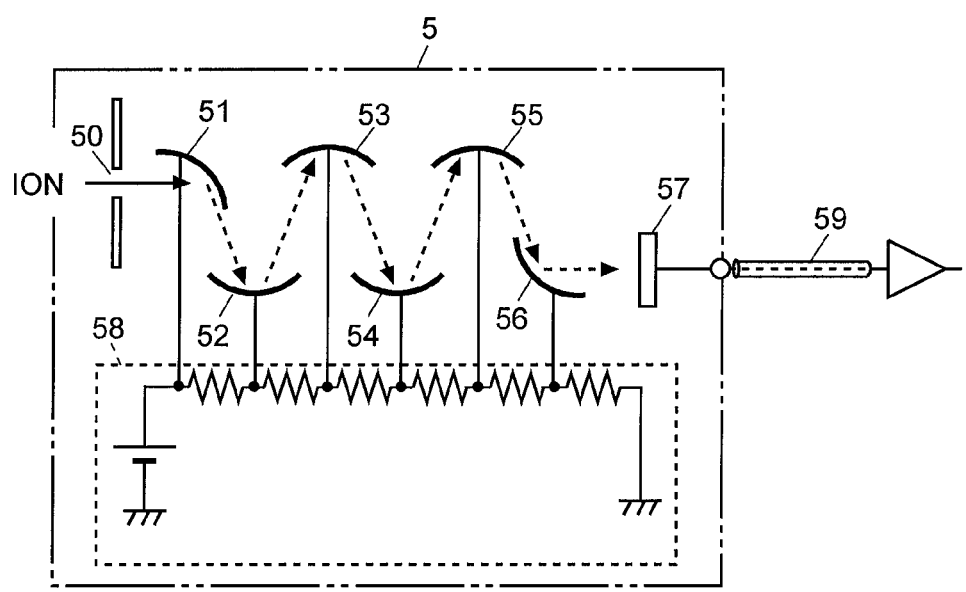
FIG. 4 is a schematic configuration diagram showing one example of the ion detector shown in FIG. 3.

In the example of FIG. 1A, all the flanges 10a of the attachment plate 10 are in contact with the inner surface of the vacuum chamber 1 via the cushioning members 12. This configuration produces a high level of vibration-suppressing effect but has the following problem: As shown in FIG. 3, ions passing through the quadrupole mass filter 4, i.e. ions which are to be detected with the ion detector 5, have the highest density in the vicinity of the ion beam axis C. The ion beam axis in the quadrupole mass filter 4 is the central axis of the arrangement of the four rod electrodes. Accordingly, in a system configured as shown in FIGS. 3 and 4, it is necessary to make the central axis of the quadrupole mass filter 4 coincide with that of the ion entrance 50 of the ion detector 5 so as to efficiently introduce the ions into the ion detector 5, and the arrangement of the members concerned are adjusted to satisfy this requirement.

Even if the vacuum chamber 1 vibrates, the coincidence of the two aforementioned central axes will be maintained if the quadrupole mass filter 4 and the ion detector 5 vibrate in the same way (or if none of them vibrates). By contrast, if the vibration of the ion detector 5 is suppressed in the previously described manner due to the effect of the cushioning members 12 while the quadrupole mass filter 4 fixed to the vacuum chamber 1 vibrates, the coincidence of the central axes is less likely to be maintained. On the other hand, suppressing the vibration of the signal cable 59 extracted from the ion detector 5 is necessary in order to reduce the noise.

Figure 1B:
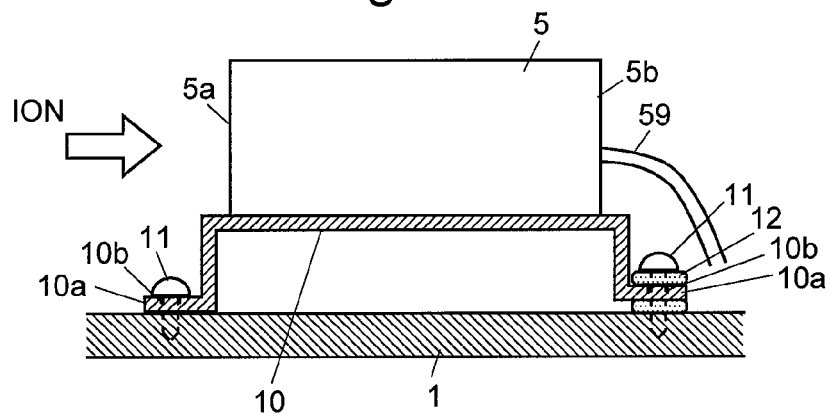
Figure 1C:
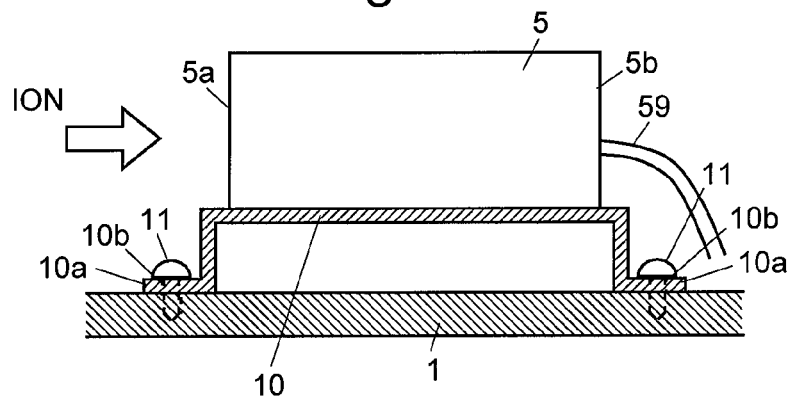
FIG. 1C shows an attachment structure for a detector in a conventional mass spectrometer.

To address this problem, an attachment structure according to another embodiment of the present invention may be adopted as shown in FIG. 1B. In this example, the flange 10a located on the side of the ion entrance surface 5a through which ions enter is directly fixed to the vacuum chamber 1 with the screw 11 without the cushioning members 12 inserted in between. That is to say, it is fixed in the same manner as in FIG. 1C. On the other hand, the other flange 10a located on the side of the detection-signal extraction surface 5b from which the signal cable 59 is extracted is fixed to the vacuum chamber 1 with the screw 11 via the cushioning members 12 in the same manner as in FIG. 1A. According to this configuration, when the vacuum chamber 1 vibrates, the ion entrance surface 5a of the ion detector 5 vibrates in the same way as the vacuum chamber 1, while the vibration of the detection-signal extraction surface 5b is suppressed.

Naturally, as compared to the structure of FIG. 1A, the present structure is less effective in suppressing the vibration of the detection-signal extraction surface 5b. However, the vibration can be suppressed to such a level as to sufficiently reduce the noise if there is a certain distance between the ion entrance surface 5a and the detection-signal extraction surface 5b, i.e. if the ion detector 5 has an elongated shape. Thus, it is possible to reduce the noise without sacrificing the efficiency of introducing ions into the ion detector 5.

It should be noted that the previous embodiment is a mere example of the present invention, and any change, addition or modification appropriately made within the spirit of the present invention will evidently fall within the scope of claims of the present patent application.

REFERENCE SIGNS LIST

1 . . . Vacuum Chamber
2 . . . EI Ion Source
3 . . . Ion Lens
4 . . . Quadrupole Mass Filter
5 . . . Ion Detector
50 . . . Ion Entrance
51 . . . Conversion Dynode
52-56 . . . Dynode
57 . . . Collector
58 . . . Power Source
59 . . . Signal Cable
5a . . . Ion Entrance Surface
5b . . . Detection-Signal Extraction Surface
6 . . . Turbomolecular Pump
7 . . . Rotary Pump
8 . . . Connecting Tube
10 . . . Attachment Plate
10a . . . Flange
10b . . . Screw Hole
11 . . . Screw
12 . . . Cushioning Member
C . . . Ion Beam Axis

The invention claimed is:

1. A mass spectrometer comprising:
a mass analyzer for mass-separating ions to be analyzed provided inside a vacuum chamber configured to be evacuated by a vacuum pump; and
a detector for detecting the mass-separated ions provided inside the vacuum chamber,
wherein:
the detector is fixed to the vacuum chamber via a cushioning member.

2. The mass spectrometer according to claim 1, wherein:
an attachment part on an ion entrance side of the detector is fixed to the vacuum chamber without the cushioning member inserted in between while an attachment part on a detection-signal extraction side of the detector is fixed to the vacuum chamber via the cushioning member.

3. The mass spectrometer according to claim 2, wherein:
the detector includes a secondary electron multiplier.

* * * * *